B. C. CHAMBERS.
Sawing-Machines.

No. 134,033. Patented Dec. 17, 1872.

Witnesses
E. A. Bates
C. B. Steele

Inventor,
Benjamin C. Chambers
by T. Connolly
atty.

UNITED STATES PATENT OFFICE.

BENJAMIN C. CHAMBERS, OF SHADY PLAIN, PENNSYLVANIA.

IMPROVEMENT IN SAWING-MACHINES.

Specification forming part of Letters Patent No. 134,033, dated December 17, 1872.

*To all whom it may concern:*

Be it known that I, BENJAMIN C. CHAMBERS, of Shady Plain, in the county of Armstrong and State of Pennsylvania, have invented certain new and useful Improvements in Sawing-Machines; and I do hereby declare that the following is a full, clear, and exact description thereof that will enable others skilled in the art to which it appertains to make and use the same, reference being had to the accompanying drawing and to the letters of reference marked thereon which form a part of this specification.

Figure 1:
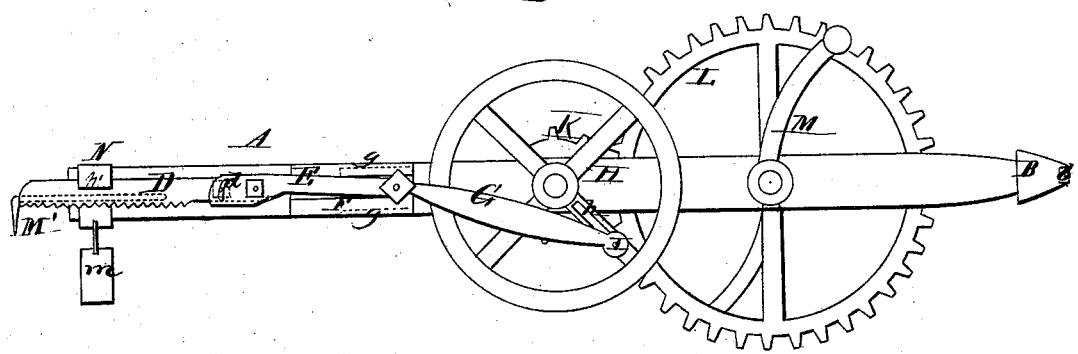
Figure 2:
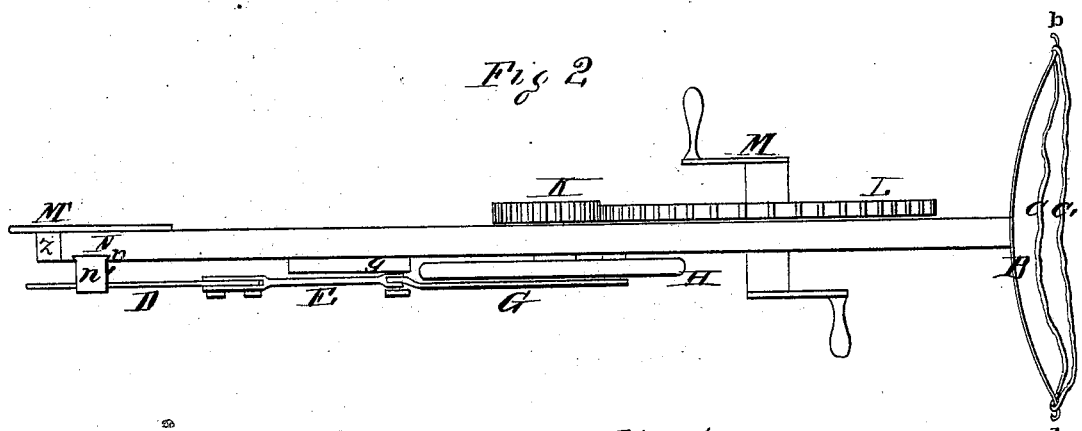
Figure 3:
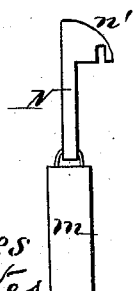
Figure 4:
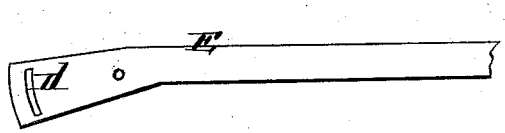

In the drawing, Figure 1 is a side view of my invention; Fig. 2 is a top view, and Figs. 3 and 4 are detail views.

My invention has relation to hand sawing-machines; and it consists in the construction and novel arrangement of devices for securing the frame of the machine to the body of the operator; in the construction and novel arrangement of an adjustable reciprocating saw; of devices for conveying motion to the same; and of a self-adjusting weighted saw-guide, designed to steady the saw and feed it to the log, all substantially as hereinafter described.

Referring to the drawing, A designates a straight beam or bar constituting the frame of the machine. To one end of this beam is secured a curved elastic plate, B, which is adapted to spring around the body of the operator in order to steady and support the machine. To the rings or loops $b$ on the ends of this plate are attached two bands, C C', the former being designed to encircle the waist and the latter to pass up in front of the shoulders and around the back of the neck of the operator. D denotes the saw, having in its rear end two holes to receive bolts securing it to an arm, E, which is constructed with a curved slot at $d$ in order that the saw may be adjusted to different angles, one of said bolts being passed through said slot. The arm E receives the saw in a mortise formed in its end, as shown. The arm E is pivoted to a block, F, which is arranged to slide between flanged guides $g$ secured to the beam A, and is also pivoted to the end of a pitman, G, which is connected by means of a bolt, I, to a radially-slotted wheel, H.

The bolt or connecting-pin I enters the slot $h$; hence the pitman may be adjusted to different positions to regulate the length of the stroke of the saw. The wheel H, as will be perceived, is a balance-wheel. On one end of the shaft of said balance-wheel is a pinion, K, which engages with a spur-wheel, L, journaled to the beam A, and operated through the medium of the right and left hand cranks M, which are attached to its shaft and arranged within convenient reach of the operator. N designates a dovetailed block arranged within a corresponding groove formed in the beam at $n$. This block has a projecting flange, $n'$, with a groove in its under surface, through which the saw works and by which it is guided. This block descends with the saw, and may have attached to its lower end a weight, $m$, to draw the saw more closely to its work. M' represents a pivoted dog, designed to be attached to the log, and to serve as a means of steadying and holding in position the forward end of the machine. Z designates a sharp projection on the end of the beam A, which, by being pressed into the log, assists in steadying the same.

Having fully described my invention, what I claim as new, and desire to secure by Letters Patent is—

1. The plate B and straps C C', in combination with the beam A, gearing L K, cranks M, balance-wheel H, pitman G, arm E, and saw D, substantially as specified.

2. The arm E having the curved slot $d$, in combination with the pivoted adjustable saw-blade D, substantially as specified.

3. The beveled descending-guide N grooved to receive the saw-blade, in combination with the beam A, having a corresponding groove to receive said guide, and with the weight $m$ attached to the latter, substantially as described.

In testimony that I claim the foregoing I have hereunto set my hand this 24th day of August, 1872.

BENJAMIN COULTER CHAMBERS.

Witnesses:
WILLIAM M. COCHRAN,
R. S. COCHRAN.